(12) United States Patent
Hornback (10) Patent No.: US 10,883,407 B1
(45) Date of Patent: Jan. 5, 2021

(54) AUTOMOTIVE AFTERTREATMENT SYSTEM HAVING A TUBULAR INJECTOR

(71) Applicant: Faurecia Emissions Control Technologies, USA, LLC, Columbus, IN (US)

(72) Inventor: Jerome B. Hornback, Greenwood, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 0 days.

(21) Appl. No.: 16/523,139

(22) Filed: Jul. 26, 2019

(51) Int. Cl.
*F01N 3/28* (2006.01)
*F01N 3/20* (2006.01)
*B60K 13/04* (2006.01)
*B01D 53/94* (2006.01)

(52) U.S. Cl.
CPC ....... *F01N 3/2896* (2013.01); *B01D 53/9418* (2013.01); *B01D 53/9431* (2013.01); *B60K 13/04* (2013.01); *F01N 3/208* (2013.01); *F01N 3/2073* (2013.01); *F01N 2610/02* (2013.01); *F01N 2610/06* (2013.01); *F01N 2610/14* (2013.01)

(58) Field of Classification Search
CPC ...... F01N 3/2896; F01N 3/2073; F01N 3/208; F01N 2610/14; F01N 2610/02; F01N 2610/06; B01D 53/9431; B01D 53/9418; B60K 13/04
USPC .................................. 60/282, 295, 300, 301
See application file for complete search history.

(56) References Cited

U.S. PATENT DOCUMENTS

| 7,448,207 | B2 * | 11/2008 | Jozsa | B01F 3/04021 60/274 |
| 9,346,017 | B2 * | 5/2016 | Greber | B01D 53/94 |
| 2011/0219745 | A1 * | 9/2011 | Griffin | B01F 5/0618 60/274 |
| 2015/0121855 | A1 * | 5/2015 | Munnannur | F01N 3/2066 60/295 |
| 2017/0087515 | A1 * | 3/2017 | Huang | B01D 53/9477 |

* cited by examiner

*Primary Examiner* — Hoang M Nguyen
(74) *Attorney, Agent, or Firm* — Barnes & Thornburg LLP (57) ABSTRACT

An exhaust aftertreatment system for use with an automotive diesel engine, the system includes a selective catalytic reduction unit a reagent storage tank, and a reagent distribution system. A reagent fluid is stored in the reagent storage tank. The reagent is delivered to exhaust gases produced by the engine using the reagent distributor. The selective catalytic reduction unit is positioned downstream of the reagent distributor and is configured to remove effluents from the exhaust gases.

16 Claims, 5 Drawing Sheets

AUTOMOTIVE AFTERTREATMENT SYSTEM HAVING A TUBULAR INJECTOR

BACKGROUND

The present disclosure relates to exhaust aftertreatment systems for automotive applications, and particularly to an aftertreatment system that injects and mixes a reagent into exhaust gases to reduce unwanted nitrous oxide (NOx) in the exhaust gases.

SUMMARY

A vehicle in accordance with the present disclosure includes an internal combustion engine that produces exhaust gases and an exhaust aftertreatment system configured to treat the exhaust gases before releasing them into the atmosphere. The exhaust aftertreatment system can include a number of exhaust treatment devices such as, for example, a diesel oxidation catalyst (DOC), a diesel particulate filter (DPF), a selective catalytic reduction unit (SCR), and reagent distribution system.

In illustrative embodiments, the exhaust aftertreatment system includes a reagent distribution assembly. The reagent distribution assembly includes a reagent distributor fluidly coupled to a reagent storage tank containing a reagent (typically aqueous urea solution or ammonia gas). The reagent distributor extends into a mixer duct that carries exhaust gas from an engine and discharges the reagent into the exhaust gases moving through the passageway ahead of the selective catalytic reduction unit where the reagent chemically reacts with the exhaust gases removing nitrous oxides (NOx) from the exhaust gases.

In illustrative embodiments, the reagent distributor includes a first panel that is shaped to include channels and a second panel coupled to the first panel to close the channels and define tubular passages. These tubular passages are arranged in the passageway of the mixer duct. When the reagent is delivered to the reagent distributor, it flows through the tubular passages and is discharged into the exhaust passageway through openings formed in one or both of the first panel and the second panel.

In illustrative embodiments, the exhaust aftertreatment system may further comprise a purge system configured to selectively deliver a purge fluid to the regent distributor to flush the tubular passages of unused reagent. The purge system can include a purge-fluid supply coupled to the reagent distributor, a control system, a first check valve, and a second check valve. The first check valve in the illustrated embodiment is configured to open and close a reagent supply line that delivers the reagent to the reagent distributor. The second check valve in the illustrated embodiment is configured to open and close a purge supply line that delivers the purge fluid to the reagent distributor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
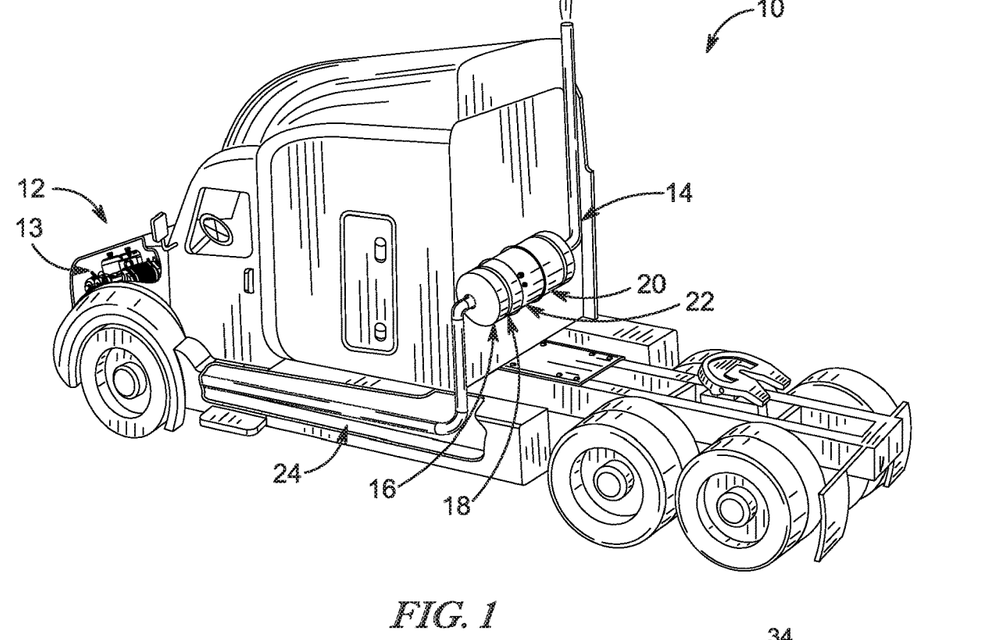
FIG. 1 is perspective view of an automotive vehicle including an internal combustion engine contained within an engine compartment of the vehicle and an exhaust aftertreatment system fluidly coupled with the engine to treat the exhaust gases before they are released to the atmosphere.

A diesel engine vehicle 10 in accordance with the present disclosure is shown in FIG. 1 and includes a combustion engine 12 and an automotive exhaust aftertreatment system 14. The engine 12 is contained within an engine compartment 13 of the vehicle 10. During use, the engine 12 combusts air and fuel which produces exhaust gases that are directed toward the atmosphere through an exhaust pipe 24. The exhaust aftertreatment system 14 is coupled fluidly with the exhaust pipe 24 to remove undesirable materials from the exhaust gases so as to manage contaminants discharged to the atmosphere.

In the illustrative embodiment, the exhaust aftertreatment system 14 includes a plurality of exhaust aftertreatment devices such as, for example, a diesel oxidation catalyst (DOC) 16, a diesel particulate filter (DPF) 18, a selective catalytic reduction unit (SCR) 20, and reagent distribution system 22. Each of the DOC 16, the DPF 18, the SCR 20, and the reagent distribution system 22 aid in treating the exhaust gases and removing harmful effluents, such as carbon monoxide, hydrocarbons, particulates, and nitrogen oxide (NOx), before the exhaust gases are released into the atmosphere. One or more of the aftertreatment devices may be located in the engine compartment 13 with the engine 12 while others may be located downstream of the engine 12 outside engine compartment 13.

Figure 2:
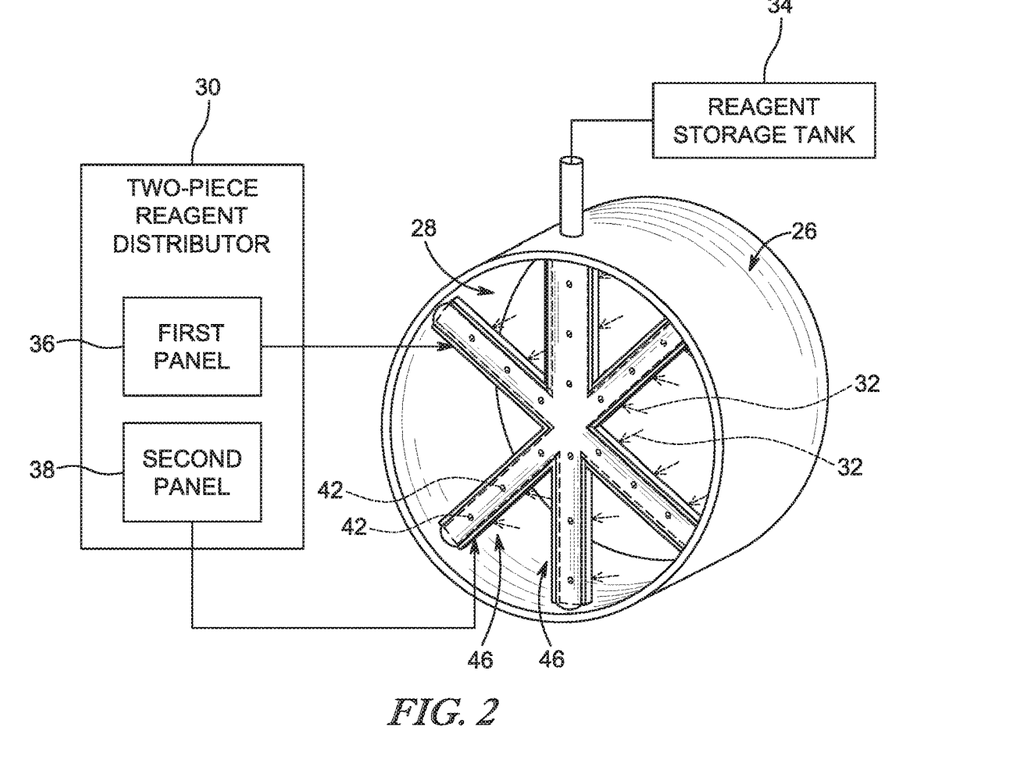
FIG. 2 is a perspective view of a reagent distribution assembly used as part of the exhaust aftertreatment system that is configured to mix a chemical reagent with exhaust gases from the internal combustion engine showing that the reagent distribution assembly includes (i) a mixer duct defining an exhaust gas passageway and (ii) a reagent distributor coupled fluidly with a reagent storage tank that is located at least partially in the exhaust passageway to deliver the reagent to the exhaust gases.

The reagent distribution system 22 includes a mixer duct 26 defining an exhaust passageway 28 and a reagent distributor 30 that that extends into the exhaust passageway 28 as shown in FIG. 2. The reagent distributor 30 discharges a reagent 32 into the exhaust gases. The reagent 32 is stored in a reagent storage tank 34 located on the vehicle 10 and may include urea, NH3 carbonate, or another suitable gaseous or aqueous reduction agent that is mixed with water to form a solution. In other embodiments, ammonia gas may be used as the reagent. In any case, the reagent is adapted to chemically react with NOx in the exhaust gases so that the NOx is transformed into more acceptable compounds before being discharged into the atmosphere.

The reagent distributor 30 encourages distribution of the reagent throughout the exhaust gases in the exhaust passageway 28 to increase a transformation rate of NOx into molecular nitrogen and water vapor prior to reaching the SCR 20. The reagent 32 is formulated to react with a catalyst within the SCR 20 to transform NOx in the exhaust gases into molecular nitrogen and water vapor. The reagent distribution system 22 may be located in the engine compartment 13 with the engine 12 or downstream and outside of the engine compartment 13.

Figure 3:
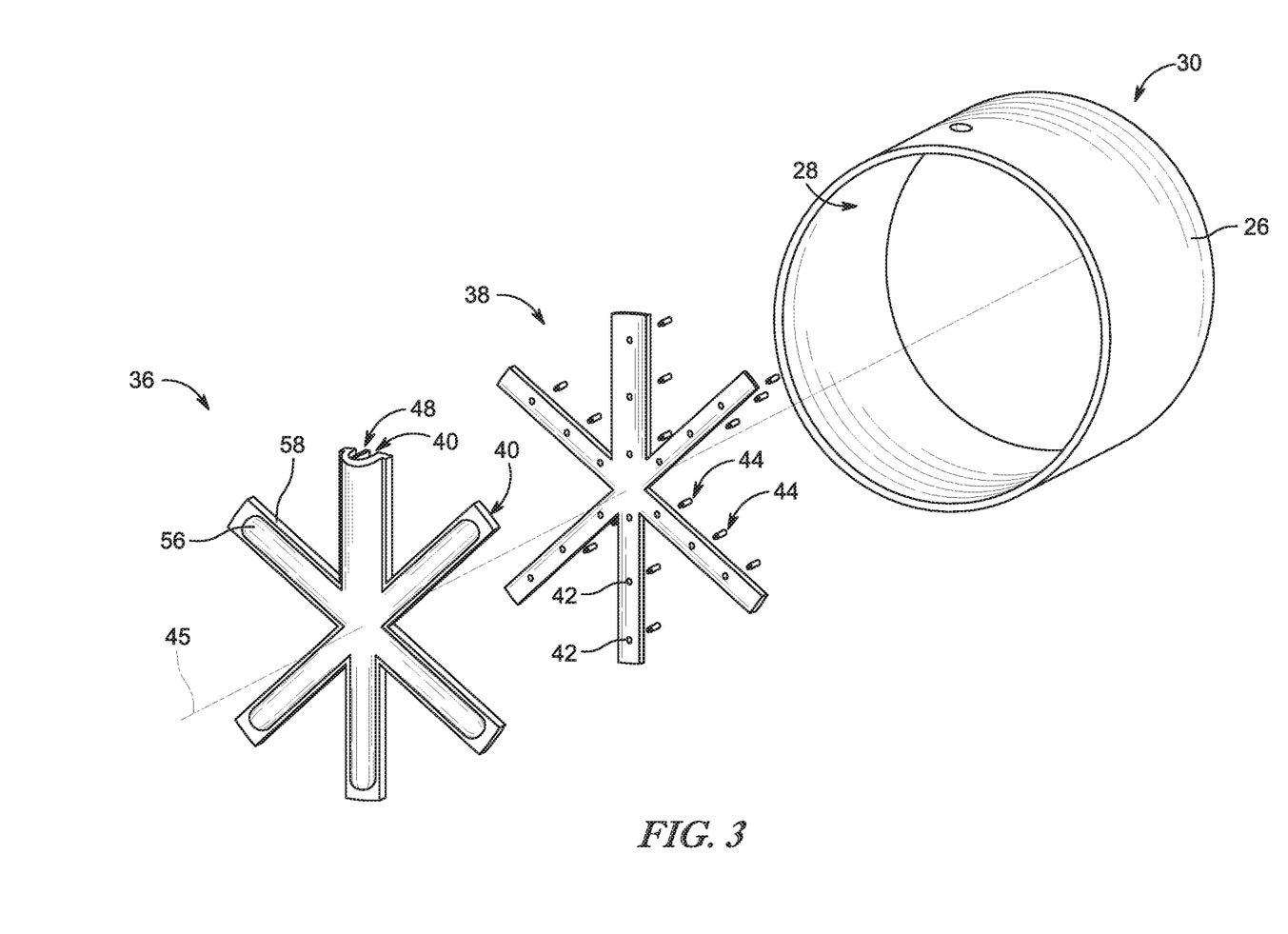
FIG. 3 is an exploded assembly view of the reagent distribution assembly from FIG. 2 showing that the reagent distributor includes a first panel that is stamped or pressed to form channels and a second panel coupled with the first panel to close the channels formed in the first panel thereby defining tubular passages that are arranged in the passageway of the mixer duct.

While some reagent distributors are formed as one piece with tubular passages, the reagent distributor 30 of the illustrative embodiment is manufactured in multiple pieces as suggested in FIG. 3. The pieces are subsequently joined together to facilitate formation of the reagent distributor 30. This approach can increase customizability and/or reduce cost of the reagent distributor 30. In the illustrative embodiment, the reagent distributor 30 includes a first panel 36 and a second panel 38 coupled to the first panel 36. The first panel 36 is illustratively embodied as a metallic plate with a substantially constant thickness. The first panel 36 is shaped to include channels 40 and the second panel 38 is coupled to the first panel 36 to close the channels 40 and define tubular passages 41 arranged in the passageway of the mixer duct. In one embodiment, the first panel 36 is stamped or pressed to form the channels 40. In another embodiment, the first panel 36 is molded with the channels 40.

One or both of the first panel 36 and the second panel 38 may be formed to include openings 42 (i.e. by stamping, drilling, or pressing) into the tubular passages 41 that are sized to allow for discharge of reagent 32 flowing to the reagent distributor 30 into the passageway 28 of the mixer duct 26 as shown in FIGS. 2 and 3. Nozzles 44 may be coupled to the reagent distributor 30 at the openings 42 to accelerate/distribute the reagent discharged into the exhaust passageway 28. The nozzles 44 are configured to control a spray pattern of reagent 32 flowing into the passageway 28 of the mixer duct 26 from the openings 42 to increase mixing of the reagent 32 with the exhaust gases.

Figure 4:
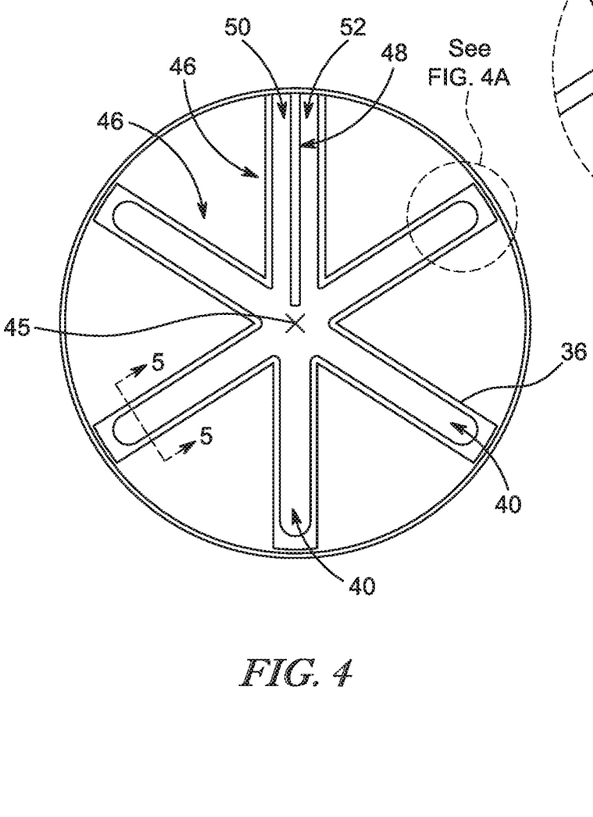
FIG. 4 is an elevation view looking upstream at the reagent distribution assembly with the second panel removed to show each of the channels formed in the first panel.

The reagent distributor 30 is shaped so that the tubular passages 41 are defined by trunks 46 within the passageway 28 of the mixer duct 26 as shown in FIGS. 3 and 4. These trunks 46 allow exhaust gas to pass through the passageway 28 around the trunks 46. The trunks 46 extend radially outward from a central axis 45 that extends generally through a center of the mixer duct 26. In the illustrative embodiment, the reagent distributor 30 includes a total of six trunks 46 that are equally spaced circumferentially from one another; however, in other embodiments, the number of trunks 46 may be more or less than six and they may be unequally spaced circumferentially from one another. In other embodiments, the tubular passages 41 may have arcuate, round, zig-zag, spiral, or other shapes as desired.

At least one of the trunks 46 is formed to include two tubular passages 41 separated by a divider 48 extending radially through the tubular passage 41 as shown in FIGS. 3 and 4. The divider 48 provides a supply passageway 50 and a return passageway 52 generally parallel to one another. The supply passageway 50 is fluidly coupled with the reagent storage tank 34 and directs the reagent from the fluid storage tank 34 into the other tubular passageways 41 for discharge into the exhaust passageway 28. The return passageway 52 may be opened to release unused reagent 32 from the tubular passageways 41 such as, for example, when the reagent 32 is not being discharged into the exhaust passageway 28 from the openings 42 and/or nozzles 44.

Figure 4A:
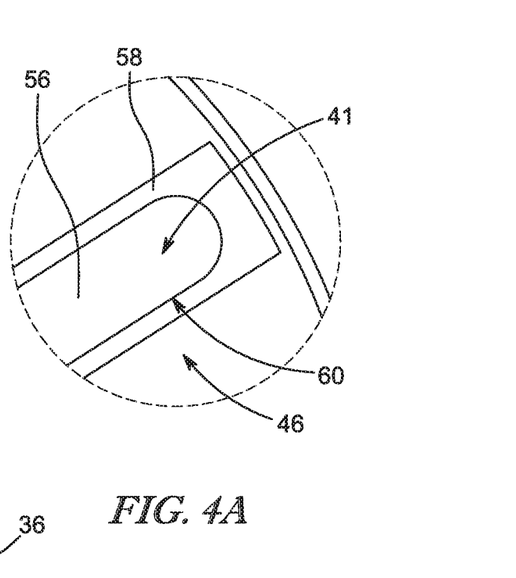
FIG. 4A is an enlarged portion of FIG. 4 showing that the first panel includes a curved section defining the channel and a peripheral flange section surrounding the channel to provide attachment areas for the joining of the second panel to the first panel to close the channels and provide the tubular passages in the exhaust passageway.
Figure 5:
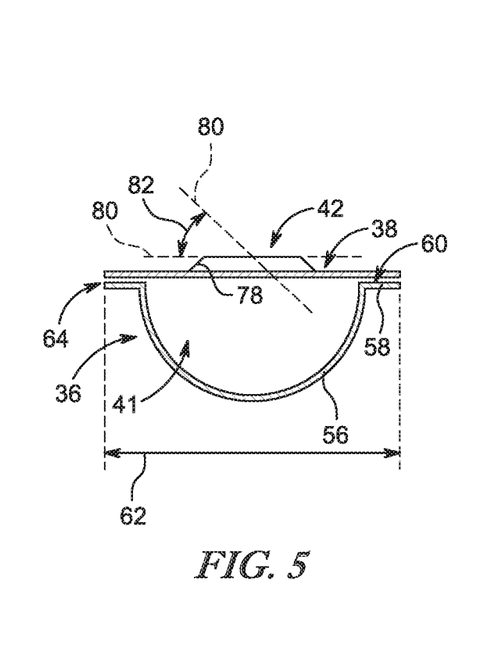
FIG. 5 is a cross sectional view of the reagent distribution assembly from FIGS. 1-4 showing the first panel formed with a channel and the second panel provided as a substantially flat plate that is sized so that the flange section of the first panel is generally aligns with a width of the second panel so that the first and second panels overlap to provide attachment areas for joining the first and second panels together.

Once stamped or pressed, the first panel 36 includes a curved section 56 defining the tubular passages 41 and a peripheral flange section 58 that extends around the curved section 56 to provide attachment areas 60 for joining the first and second panels 36, 38 together as shown in FIGS. 4A and 5. The second panel 38 is sized with a width 62 that aligns with the peripheral flange section 58 on each side of the trunks 46 so that the peripheral flange section 58 overlaps with the second panel 38. In the illustrative embodiment, the width 62 of the second panel 38 is equal to an outermost extent 64 of the peripheral flange section 58, as shown in FIG. 5, although in other embodiments the width of the second panel 38 may be more or less than the outermost extent 64 of the peripheral flange section 58. During manufacturing, the second panel 38 is secured to the first panel 36 at the attachment areas 60 by a suitable metal joining process such as, for example, brazing, welding, or soldering. In other embodiments, fasteners such as rivets or screws may be used. Moreover, the second panel 38 may be fixed in place relative to the first panel 36 without direct coupling—so long as tubular passageways 41 are ultimately defined (at least in part) by the first panel 36 and the second panel 38.

Figure 6:
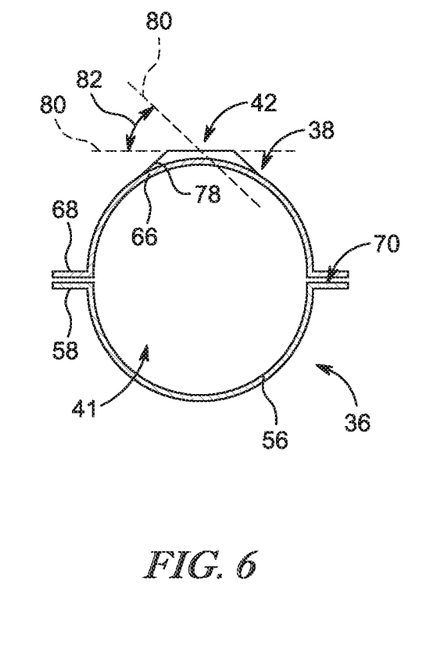
FIG. 6 is a cross sectional view of a second embodiment of the reagent distribution assembly with the second panel also being formed to include a channel and having flanges that correspond with the flange section of the first panel to provide attachment areas for joining the first and second panels together.

The second panel 38 may also be stamped or pressed to form a curved section 66 and peripheral flange section 68 as shown in FIG. 6. The peripheral flange section 68 of the second panel 38 aligns with the peripheral flange section 58 of the first panel 36 to provide attachment areas 70 for joining the first panel 36 to the second panel 38.

Figure 7:
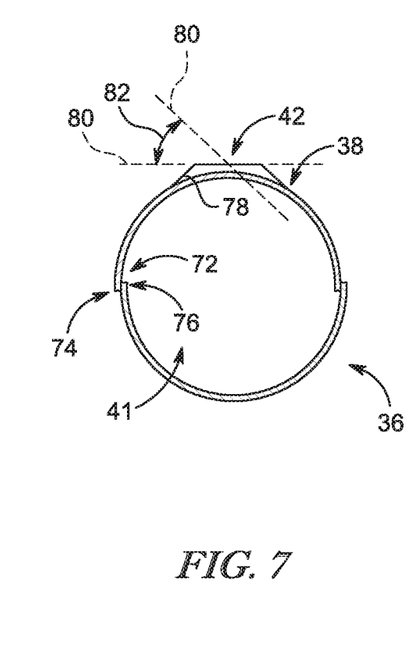
FIG. 7 is a cross sectional view of a third embodiment of the reagent distribution assembly with the first and second panels formed to include channels and formed without a flange section and showing that the first and second panels are slightly offset from one another so that edges of the panels overlap to provide attachment areas for joining the first and second panels together.

In another embodiment, the first and second panels 36, 38 may be formed without peripheral flange sections and offset relative to one another as shown in FIG. 7. The first and second panels are stamped or pressed so that they have a semicircular cross-section with ends 72, 74. The first and second panels 36, 38 are offset such that the ends 72, 74 overlap with one another to provide attachment areas 76 for joining the first panel 36 to the second panel 38.

Forming the reagent distributor 30 from multiple pieces also permits optimum positioning and orienting of the openings 42 relative to the first panel 36 and/or the second panel 38 as suggested in FIGS. 5-7. Once formed in one or both of the panels 36, 38, each opening 42 is defined by a conically shaped wall 78 that is truncated along a plane 80 to provide the opening 42 into the tubular passages 41. The plane 80 may be oriented at any angle 82. The reagent 32 is released through each opening 42 in a direction that is generally normal to the plane 80. The nozzles 44, if used, are coupled to the wall 78 so that they are also oriented in a direction normal to the plane 80.

Each opening 42 in the reagent distributor 30 may be oriented differently from one another to optimize discharge of the reagent 32 into the exhaust passageway 28 and enhance mixing of the reagent 32 with the exhaust gases. For example, each opening 42 may be oriented such that the planes 80 at which they are arranged all face in the same circumferential direction relative to the central axis 45 to induce a swirl of reagent 32 in the exhaust passageway 28 as the reagent exits each opening 42. In another embodiment, each opening 42 may be oriented such that the planes 80 are juxtaposed circumferentially relative to one another.

Figure 8:
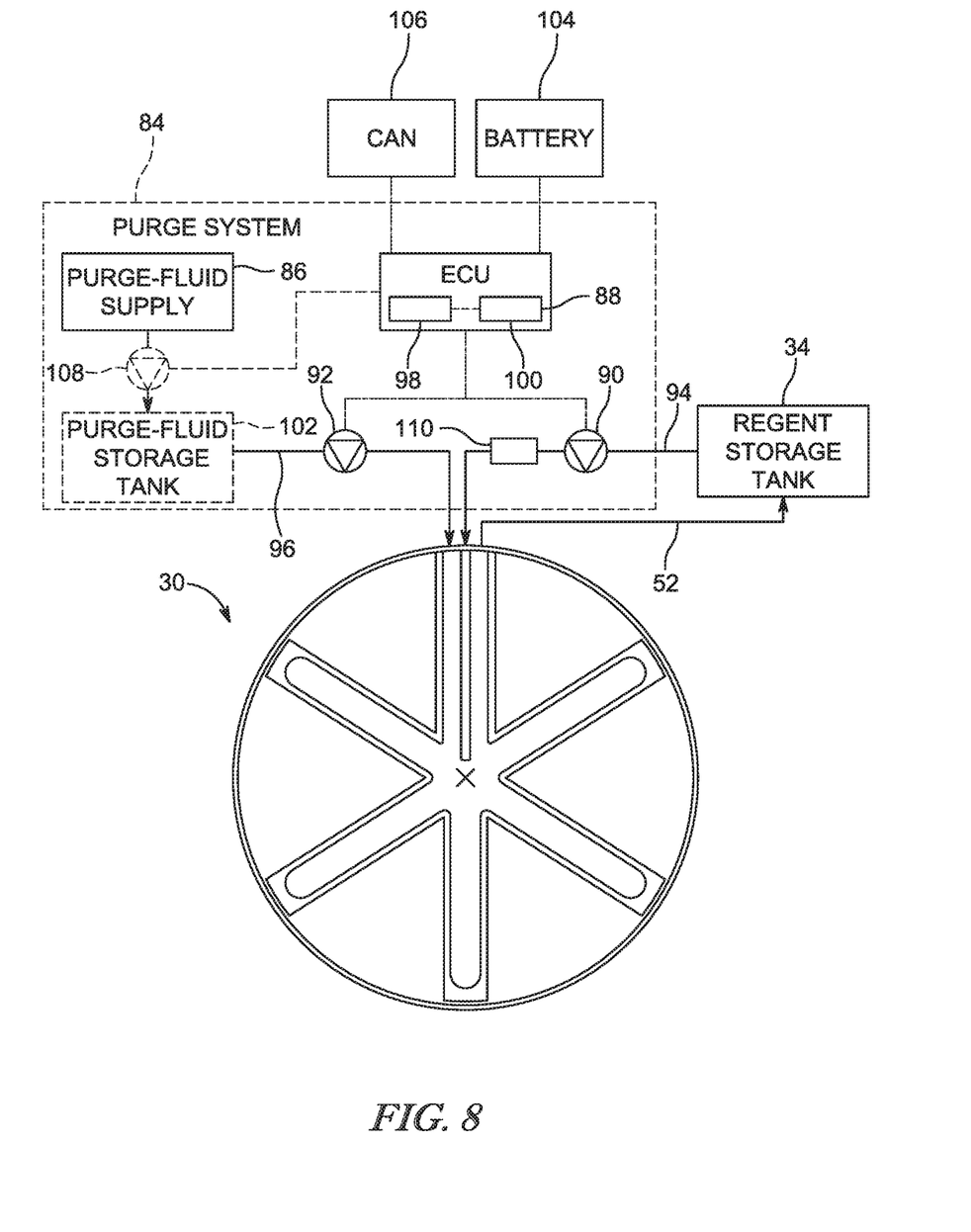
FIG. 8 is a diagrammatic view of a purge system coupled with the reagent distribution assembly and including a purge fluid supply configured to selectively deliver a purge fluid to the tubular passages to flush unused reagent from the reagent distributor.

The reagent distributor 30 described above may be used with a purge system 84 that selectively delivers purge fluid to the reagent distributor 30 to remove unused reagent 32 remaining in the tubular passages 41 as shown in FIG. 8. The purge system 84 includes a purge-fluid supply 86 fluidly coupled to the reagent distributor 30, a control system 88 configured to selectively cause delivery of purge fluid to the reagent distributor 30, a first check valve 90, and a second check valve 92. The first check valve 90 is configured to open and close a reagent supply line 94 that delivers the reagent 32 to the reagent distributor 30. The second check valve 92 is configured to open and close a purge supply line 96 that delivers the purge fluid to the reagent distributor 30.

Flushing the reagent distributor 30 to remove unused reagent 32 blocks reagent 32 from crystalizing in the reagent distributor 30 which could affect effluent treatment performance. The control system 88 is configured to command the valves 90, 92 to open and close to flush the reagent distributor 30 of reagent 32 when the reagent distributor 30 is not being used.

The control system 88 may be an engine control unit (ECU) and includes all of the functionality needed to operate the purge system 84. The control system 88 includes a processor 98 and a memory-storage unit 100 storing instructions that, when executed by the processor 98, cause the valves 90, 92 to open and/or close. The control system 88 is electrically coupled to a power supply such as a battery 104 in the vehicle 10 and a controlled area network 106 so that the control system 88 may communicate with other electrical systems in the vehicle 10 for timing the opening and closing of the valves 90, 92 and delivery of purge fluid and/or reagent 32 to the distributor 30.

The second valve 92 is configured to couple the purge fluid to the reagent distributor 30 when the first valve 90 closes the reagent supply line 94 so as to flush the reagent distributor 30 of reagent 32. For example, when the engine 12 is turned off and no exhaust gases are no longer flowing through the exhaust passageway 28, the control system 88 commands the second check valve 92 to open and deliver purge fluid to the reagent distributor 30. At the same time, the control system 88 commands the first check valve 90 to close so that reagent 32 is no longer supplied to the reagent distributor 30. Unused reagent 32 may be redirected back to the reagent storage tank 34 by the purge fluid though the return passageway 52.

The purge fluid may come from any suitable purge-fluid supply 86 such as, for example, an air compressor, an air brake, or outlet exhaust gases from a turbocharger coupled with the engine 12. When outlet exhaust gases from the turbocharger are used, the control system 88 commands the second valve 92 to open while the engine 12 is still running to insure there is sufficient pressure in the outlet exhaust gases to flush the reagent distributor 30 of reagent 32. When other sources of purge fluid are used, an optional purge-fluid storage tank 102 may be coupled with the purge fluid supply line 96 and configured to receive and store the purge fluid. In this way, purge fluid is stored with a sufficient pressure to flush the reagent distributor 30 of reagent when desired. An optional check valve 108 is coupled with the purge-fluid supply line 96 upstream of the purge-fluid storage tank 102 to maintain pressure in the purge-fluid storage tank 102 above a threshold level.

In some embodiments, one or more heating element 110 may be coupled with the reagent supply line 94 as shown in FIG. 8. The heating element 110 is configured to heat the reagent supply line 94 between the reagent storage tank 34 and the reagent distributor 30 so as to encourage decomposition of reagent 32 flowing into the exhaust passageway 28.

In some embodiments of the present disclosure, tubular construction of the reagent distributor 30 includes stamped halves 36, 38 for potentially lower manufacturing cost and higher durability. In the illustrative embodiment, the reagent distributor 30 may use standard nozzle tips 44 to allow more precise spray pattern and lower cost. In the illustrative embodiment, the supply side urea line 94 may be heated (i.e. by 110) for better decomposition of urea. The present system 22 may provide low volume, low pressure, low duty cycle, low cost. An air purge pump, or system, may be provided to address urea crystallization remaining in the system for engine off conditions. Some reagent distributors have a bent tube with drilled holes supported by tubing. These typical reagent distributors may be costly to manufacture and may have low rigidity for durability failures.

Urea deposits and backpressure issues in SCR 20 systems incorporating designs in accordance with the present disclosure may be reduced. The illustrative reagent distributor 30 directs spray directly into exhaust stream. The reagent distributor 30 may be used with a liquid or gas reagent delivery system. Some systems use an injector or a doser for urea injection into the exhaust gases and either a mixer designed to induce swirling with the urea before the SCR catalyst or a decomposition tube with sufficient length to mix urea before the SCR catalyst. In accordance with the present disclosure, the reagent distributor 30 uses a direct spray pipe to deliver urea and/or other liquid/gas directly into exhaust stream. This reduces the need for additional features to evenly disburse urea in exhaust stream, and reduces impingement surfaces in the system where there may be deposit formation.

The following numbered clauses include embodiments that are contemplated and non-limiting:

Clause 1. A reagent distribution assembly for use in injecting a reagent into an stream of exhaust gases to treat the exhaust gases, the reagent distribution assembly comprising a mixer duct that defines a passageway configured to receive the exhaust gases and the reagent therein, and a reagent distributor that extends into the passageway and is configured to discharge the reagent into the exhaust gases moving through the passageway, wherein the reagent distributor includes a first panel arranged in the passageway of the mixer duct and shaped to include channels and a second panel coupled to the first panel to close the channels in the first panel and define tubular passages arranged in the passageway of the mixer duct.

Clause 2. The assembly of clause 1, or any other clause, wherein at least one of the first panel and second panel is formed to include openings into the tubular passages sized to allow for discharge of reagent flowing to the reagent distributor into the passageway of the mixer duct.

Clause 3. The assembly of clause 2, or any other clause, wherein the reagent distributor includes nozzles arranged at the openings into the tubular passages that are configured to control spray pattern of reagent flowing into the passageway of the mixer duct.

Clause 4. The assembly of clause 1, or any other clause, wherein the first panel has a substantially constant thickness such that the channels may be formed by stamping.

Clause 5. The assembly of clause 1, or any other clause, wherein the reagent distributor is shaped so that the tubular passages form trunks within the passageway of the mixer duct that allow exhaust gases to pass through the passageway around the trunks.

Clause 6. An exhaust aftertreatment system adapted for use in automotive applications, the system comprising
a selective catalytic reduction unit including a catalyst mounted in a housing,
a reagent storage tank configured to hold reagent comprising a water and urea solution, and
a reagent distribution assembly, the reagent distribution assembly including a mixer duct that defines a passageway configured to carry exhaust gases from an automotive engine to the selective catalytic reduction unit and a reagent distributor fluidly coupled to the reagent storage tank and that extends into the passageway and is configured to discharge reagent into the exhaust gases moving through the passageway before it interacts with the selective catalytic reduction unit,
wherein the reagent distributor includes a first panel arranged in the passageway of the mixer duct and shaped to include channels and a second panel coupled to the first panel to close the channels in the first panel and define tubular passages arranged in the passageway of the mixer duct.

Clause 7. The system of clause 6, or any other clause, wherein at least one of the first panel and second panel is formed to include openings into the tubular passages sized to allow for discharge of reagent flowing to the reagent distributor into the passageway of the mixer duct.

Clause 8. The system of clause 6, or any other clause, wherein the reagent distributor includes nozzles arranged at the openings into the tubular passages that are configured to control spray pattern of reagent flowing into the passageway of the mixer duct.

Clause 9. The system of clause 6, or any other clause, wherein the first panel has a substantially constant thickness such that the channels may be formed by stamping.

Clause 10. The system of clause 6, or any other clause, wherein the reagent distributor is shaped so that the tubular passages form trunks within the passageway of the mixer duct that allow exhaust gases to pass through the passageway around the trunks.

Clause 11. The system of clause 6, or any other clause, further comprising a heating element configured to heat fluid supply lines from the reagent storage tank to the reagent distributor and/or the reagent distributor so as to encourage decomposition of urea flowing into the passageway.

Clause 12. The system of clause 6, or any other clause, further comprising a purge system including a purge-fluid supply fluidly coupled to the reagent distributor, a control system configured to selectively deliver purge fluid to the reagent distributor, a first check valve configured to open and close a reagent supply line that delivers the reagent to the reagent distributor, and a second check valve configured to open and close a purge supply line that delivers the purge fluid to the reagent distributor.

Clause 13. The system of clause 12, or any other clause, wherein the second valve is configured to couple the purge fluid to the reagent distributor when the first valve closes the reagent supply line so as to flush the reagent distributor of reagent.

Clause 14. The system of clause 12, or any other clause, wherein the purge-fluid supply is outlet exhaust gases from a turbocharger.

Clause 15. The system of clause 12, or any other clause, wherein the purge-fluid supply is compressed air stored in a purge-fluid supply tank.

Clause 16. A vehicle, comprising
a combustion engine, and
an exhaust aftertreatment system adapted for use in automotive applications, the system including
a selective catalytic reduction unit including a catalyst mounted in a housing,
a reagent storage tank configured to hold reagent comprising a water and urea solution, and
a reagent distribution assembly, the reagent distribution assembly including a mixer duct that defines a passageway configured to carry exhaust gases from an automotive engine to the selective catalytic reduction unit and a reagent distributor fluidly coupled to the reagent storage tank and that extends into the passageway and is configured to discharge reagent into the exhaust gases moving through the passageway before it interacts with the selective catalytic reduction unit,
wherein the reagent distributor includes a first panel arranged in the passageway of the mixer duct and shaped to include channels and a second panel coupled to the first panel to close the channels in the first panel and define tubular passages arranged in the passageway of the mixer duct.

The invention claimed is:

1. A reagent distribution assembly for use in injecting a reagent into an stream of exhaust gases to treat the exhaust gases, the reagent distribution assembly comprising
a mixer duct that defines a passageway configured to receive the exhaust gases and the reagent therein, and
a reagent distributor that extends into the passageway and is configured to discharge the reagent into the exhaust gases moving through the passageway,
wherein the reagent distributor includes a first panel arranged in the passageway of the mixer duct and shaped to include channels and a second panel coupled to the first panel to close the channels in the first panel and define tubular passages arranged in the passageway of the mixer duct.

2. The assembly of claim 1, wherein at least one of the first panel and second panel is formed to include openings into the tubular passages sized to allow for discharge of reagent flowing to the reagent distributor into the passageway of the mixer duct.

3. The assembly of claim 2, wherein the reagent distributor includes nozzles arranged at the openings into the tubular passages that are configured to control spray pattern of reagent flowing into the passageway of the mixer duct.

4. The assembly of claim 1, wherein the first panel has a substantially constant thickness such that the channels may be formed by stamping.

5. The assembly of claim 1, wherein the reagent distributor is shaped so that the tubular passages form trunks within the passageway of the mixer duct that allow exhaust gases to pass through the passageway around the trunks.

6. An exhaust aftertreatment system adapted for use in automotive applications, the system comprising
- a selective catalytic reduction unit including a catalyst mounted in a housing,
- a reagent storage tank configured to hold reagent comprising a water and urea solution, and
- a reagent distribution assembly, the reagent distribution assembly including a mixer duct that defines a passageway configured to carry exhaust gases from an automotive engine to the selective catalytic reduction unit and a reagent distributor fluidly coupled to the reagent storage tank and that extends into the passageway and is configured to discharge reagent into the exhaust gases moving through the passageway before it interacts with the selective catalytic reduction unit,
- wherein the reagent distributor includes a first panel arranged in the passageway of the mixer duct and shaped to include channels and a second panel coupled to the first panel to close the channels in the first panel and define tubular passages arranged in the passageway of the mixer duct.

7. The system of claim 6, wherein at least one of the first panel and second panel is formed to include openings into the tubular passages sized to allow for discharge of reagent flowing to the reagent distributor into the passageway of the mixer duct.

8. The system of claim 7, wherein the reagent distributor includes nozzles arranged at the openings into the tubular passages that are configured to control spray pattern of reagent flowing into the passageway of the mixer duct.

9. The system of claim 6, wherein the first panel has a substantially constant thickness such that the channels may be formed by stamping.

10. The system of claim 6, wherein the reagent distributor is shaped so that the tubular passages form trunks within the passageway of the mixer duct that allow exhaust gases to pass through the passageway around the trunks.

11. The system of claim 6, further comprising a heating element configured to heat fluid supply lines from the reagent storage tank to the reagent distributor and/or the reagent distributor so as to encourage decomposition of urea flowing into the passageway.

12. The system of claim 6, further comprising a purge system including a purge-fluid supply fluidly coupled to the reagent distributor, a control system configured to selectively deliver purge fluid to the reagent distributor, a first check valve configured to open and close a reagent supply line that delivers the reagent to the reagent distributor, and a second check valve configured to open and close a purge supply line that delivers the purge fluid to the reagent distributor.

13. The system of claim 12, wherein the second valve is configured to couple the purge fluid to the reagent distributor when the first valve closes the reagent supply line so as to flush the reagent distributor of reagent.

14. The system of claim 12, wherein the purge-fluid supply is outlet exhaust gases from a turbocharger.

15. The system of claim 12, wherein the purge-fluid supply is compressed air stored in a purge-fluid supply tank.

16. A vehicle, comprising
- a combustion engine, and
- an exhaust aftertreatment system adapted for use in automotive applications, the system including
  - a selective catalytic reduction unit including a catalyst mounted in a housing,
  - a reagent storage tank configured to hold reagent comprising a water and urea solution, and
  - a reagent distribution assembly, the reagent distribution assembly including a mixer duct that defines a passageway configured to carry exhaust gases from an automotive engine to the selective catalytic reduction unit and a reagent distributor fluidly coupled to the reagent storage tank and that extends into the passageway and is configured to discharge reagent into the exhaust gases moving through the passageway before it interacts with the selective catalytic reduction unit,
- wherein the reagent distributor includes a first panel arranged in the passageway of the mixer duct and shaped to include channels and a second panel coupled to the first panel to close the channels in the first panel and define tubular passages arranged in the passageway of the mixer duct.

* * * * *